US010786332B2

(12) United States Patent
Ellis et al.

(10) Patent No.: US 10,786,332 B2
(45) Date of Patent: Sep. 29, 2020

(54) DENTAL VALVE TAILPIECE

(71) Applicant: Stoma Ventures, LLC, St. Louis, MO (US)

(72) Inventors: Mark Ellis, Chicago, IL (US); Edward Arguello, Weston, FL (US)

(73) Assignee: Stoma Ventures, LLC, Chesterfield, MO (US)

( * ) Notice: Subject to any disclaimer, the term of this patent is extended or adjusted under 35 U.S.C. 154(b) by 29 days.

(21) Appl. No.: 14/798,739

(22) Filed: Jul. 14, 2015

(65) Prior Publication Data

US 2016/0015477 A1 Jan. 21, 2016

Related U.S. Application Data

(60) Provisional application No. 62/025,593, filed on Jul. 17, 2014.

(51) Int. Cl.
*A61C 1/00* (2006.01)
*A61C 17/08* (2006.01)

(52) U.S. Cl.
CPC ............ *A61C 1/0061* (2013.01); *A61C 17/08* (2019.05)

(58) Field of Classification Search
CPC ..... A61C 1/0061; A61C 17/043; A61C 17/04; A61C 17/02; A61M 39/10; A61M 39/12; A61M 1/086; F16L 33/035
USPC ....... 433/91–96; 604/19, 22, 35, 93.01, 173, 604/542, 902; 285/148.16, 239, 256, 259
See application file for complete search history.

(56) References Cited

U.S. PATENT DOCUMENTS

| | | | | |
|---|---|---|---|---|
| 1,944,091 A | * | 1/1934 | Lutz | A61H 9/005 15/418 |
| 4,439,188 A | * | 3/1984 | Dennehey | A61J 1/00 138/109 |
| 4,479,796 A | * | 10/1984 | Kallok | A61M 31/002 424/424 |
| 4,511,163 A | * | 4/1985 | Harris | A61M 39/10 285/148.16 |
| 4,580,978 A | | 4/1986 | Motola et al. | |
| 4,597,594 A | * | 7/1986 | Kacalieff | F16L 31/00 285/239 |
| 4,925,450 A | * | 5/1990 | Imonti | A61M 1/0043 604/240 |
| 5,013,300 A | * | 5/1991 | Williams | A61M 1/008 433/91 |
| 5,066,228 A | * | 11/1991 | Doundoulakis | A61C 17/043 433/91 |
| 5,151,094 A | * | 9/1992 | Hanifl | A61M 1/008 433/91 |
| 5,295,830 A | | 3/1994 | Shen et al. | |
| 5,423,577 A | * | 6/1995 | Ketcham | F16L 37/088 277/619 |
| 5,688,121 A | * | 11/1997 | Davis | A61C 17/043 433/91 |
| 5,725,374 A | * | 3/1998 | Young | A61C 17/04 433/95 |

(Continued)

*Primary Examiner* — Heidi M Eide
(74) *Attorney, Agent, or Firm* — David H. Chervitz

(57) ABSTRACT

A tailpiece for a dental valve device is disclosed which has a body having a valve receiving end, a hose receiving end, and a hose retaining section having a hose insertion section, an inclined section, a first flat section, a first tapered ring section having a central section, a second flat section, a second tapered ring section having a central section, and a third flat section.

7 Claims, 3 Drawing Sheets

(56) References Cited

U.S. PATENT DOCUMENTS

| | | | | |
|---|---|---|---|---|
| 5,741,134 A * | 4/1998 | Davis | A61C 17/043 | |
| | | | 210/446 | |
| 5,794,983 A * | 8/1998 | Melvin | F16L 33/2076 | |
| | | | 285/256 | |
| 5,879,033 A * | 3/1999 | Hansel | F16L 33/30 | |
| | | | 285/239 | |
| 6,095,571 A * | 8/2000 | MacDuff | F16L 13/143 | |
| | | | 285/256 | |
| 6,267,303 B1 * | 7/2001 | Francis | B05B 7/30 | |
| | | | 137/893 | |
| 6,412,830 B1 * | 7/2002 | Akiyama | F16L 37/0987 | |
| | | | 285/239 | |
| 6,561,550 B1 * | 5/2003 | Kiraz | F16L 33/30 | |
| | | | 285/239 | |
| 7,131,839 B2 | 11/2006 | March | | |
| 8,453,648 B2 * | 6/2013 | Black | A61M 16/0486 | |
| | | | 128/205.24 | |
| 2003/0014842 A1 | 1/2003 | Niendorf | | |
| 2003/0080557 A1 * | 5/2003 | Benavides | F16L 33/30 | |
| | | | 285/239 | |
| 2005/0101939 A1 * | 5/2005 | Mitchell | A61M 39/10 | |
| | | | 604/533 | |
| 2006/0012168 A1 * | 1/2006 | Poirier | F16L 33/18 | |
| | | | 285/239 | |
| 2006/0079818 A1 * | 4/2006 | Yande | A61C 17/0214 | |
| | | | 601/162 | |
| 2013/0004585 A1 | 1/2013 | Crudden et al. | | |
| 2013/0006225 A1 * | 1/2013 | Cucin | A61B 10/0275 | |
| | | | 604/542 | |
| 2013/0331776 A1 * | 12/2013 | Klein | A61M 1/0039 | |
| | | | 604/35 | |
| 2014/0138944 A1 * | 5/2014 | Kury | F16L 33/2071 | |
| | | | 285/239 | |
| 2014/0170595 A1 * | 6/2014 | Williams | A61C 17/04 | |
| | | | 433/95 | |
| 2014/0252760 A1 * | 9/2014 | Paul | F16L 33/224 | |
| | | | 285/256 | |

* cited by examiner

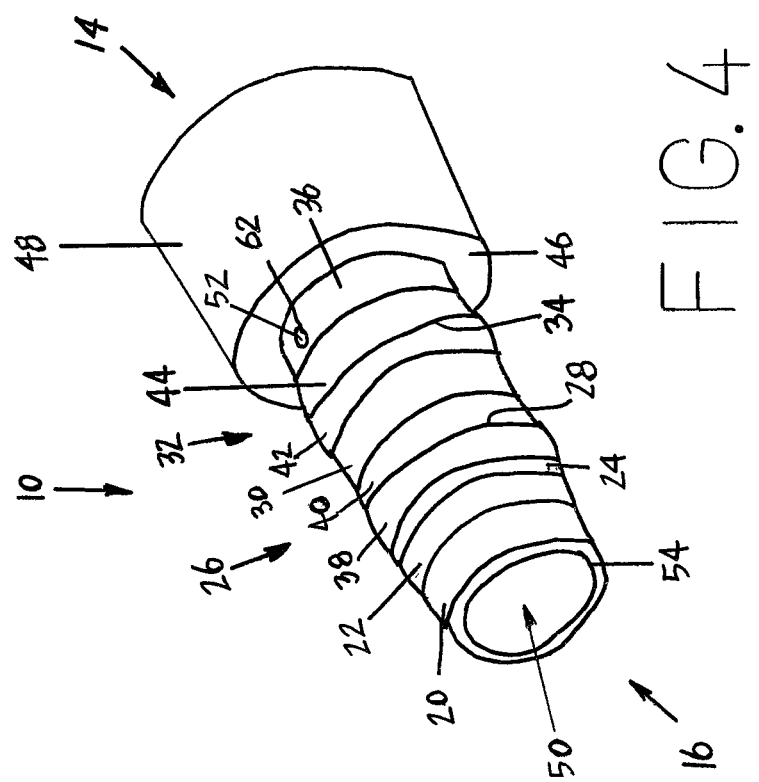
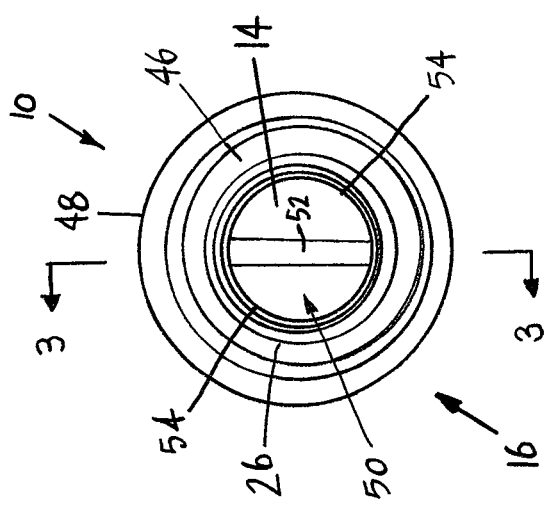

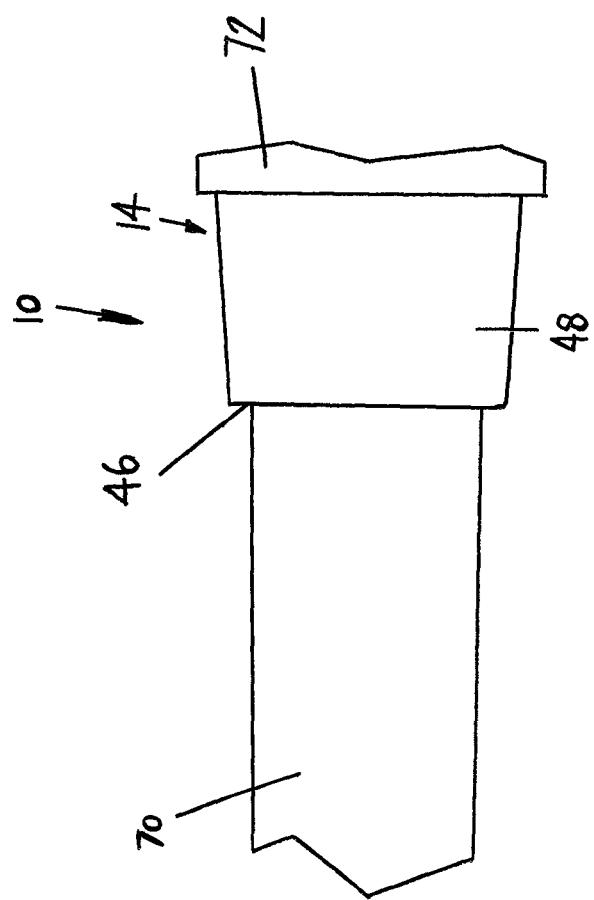

DENTAL VALVE TAILPIECE

RELATED APPLICATION

This application claim priority to U.S. Provisional Patent Application Ser. No. 62/025,593, filed on Jul. 17, 2014, the disclosure of which is incorporated herein by reference.

BACKGROUND

This disclosure relates to a tailpiece for a dental instrument and more particularly to a tailpiece used in conjunction with a dental valve device for a high volume evacuator or a low volume evacuator (saliva ejector).

During a dental procedure it is important to be able to remove saliva, blood, tooth fragments, metals, and other debris from the mouth of a patient. Removal of this matter allows a dentist to be able to perform a procedure in an unobstructed manner. Various systems or devices have been developed to remove liquid and solid materials from a mouth during a dental procedure. One device that is capable of removing saliva is known as a saliva ejector. A saliva ejector typically comprises a plastic flexible tube or tip for placement in the mouth of a patient. The saliva ejector tip is connected to a valve and the valve is connected to a hose. The hose is connected to a source of vacuum. In this manner, saliva is passed through the ejector tip and the valve to be disposed of in a sanitary manner. Once the procedure is completed, the ejector tip should be discarded and the valve should be replaced. The used valve should also be sterilized by autoclaving to be used again. Although it is suggested to autoclave the valve after use, it is known that autoclaving is hardly ever done. Another device that is capable of removing solid materials is a high volume evacuator system. A high volume evacuator system generally consists of a tube or tip that may be inserted into a mouth of a patient with the tube connected to a valve which is connected to a tailpiece with the tailpiece being connected to a hose or tubing that is in fluid communication with a source of vacuum. Again, in this manner, debris may be removed from the mouth of the patient. After the dental procedure, the tip is disposed of and the valve should be replaced. The used valve should also be sterilized by autoclaving to be used again. However, although it is suggested to sterilize the valve after use, it is known that this suggested procedure is hardly ever followed. As can be appreciated, the saliva ejector and the high volume evacuator are used to remove liquids and debris from a mouth of a patient to prevent a patient from swallowing or aspirating liquids and debris produced during a dental procedure.

As indicated, the high volume evacuator dental valve is connected to the suction hose by use of a tailpiece. The tailpiece typically has a proximal end for allowing the hose to be inserted thereon. The proximal end has either a series of barbs or screw threads for capturing the hose and holding the hose in place. Positioning the hose over the barbs or threads requires that care be taken so as not to tear or damage the hose. The barbs or threads have sharp edges and inserting or removing the hose may damage the hose.

Although these tailpieces and dental systems are beneficial, one disadvantage associated with their use is that the barbs or threads associated with the tailpieces can damage the hose connected to the source of vacuum. If this occurs then a new hose may have to be installed. During the time that a new hose has to be installed, the entire system needs to be shut down. In a single station dental practice, it may be necessary to cancel many appointments. Also, in a very busy dental practice, having one station out of commission for a period time may also require that several appointments will have to be canceled and rescheduled.

Therefore, it would be desirable to have a tailpiece for a dental valve that is adapted for easily receiving a hose that is connected to a source of vacuum. It would also be desirable to have a tailpiece that has a proximal end that does not damage a hose being connected to or removed from the tailpiece.

BRIEF SUMMARY

In one form of the present disclosure, a tailpiece for a dental valve device comprises a body having a valve receiving end, a hose receiving end, and a hose retaining section having a hose insertion section, an inclined section, a first flat section, a first tapered ring section having a central section, a second flat section, a second tapered ring section having a central section, and a third flat section.

In another form of the present disclosure, a tailpiece for a dental valve device comprises a body having a valve receiving end having a stop surface, a hose receiving end, a lumen formed between the valve receiving end and the hose receiving end and a hose retaining section formed between the stop surface and the hose receiving end having a hose insertion section, an inclined section, a first flat section, a first tapered ring section having a central section, a second flat section, a second tapered ring section having a central section, and a third flat section.

In yet another form of the present disclosure, a tailpiece for a dental valve device comprises a body having a valve receiving end having an exterior stop surface and an interior stop surface, a hose receiving end, and a lumen formed between the valve receiving end and the hose receiving end, and a hose retaining section formed between the stop surface and the hose receiving end having a hose insertion section, an inclined section, a first flat section, a first tapered ring section having a central section, a second flat section, a second tapered ring section having a central section, and a third flat section.

The present disclosure provides a tailpiece for a dental valve device that has a proximal end that does not damage a hose being inserted on the tailpiece.

The present disclosure provides a tailpiece for a dental valve device that is easy to install on a hose connected to a source of vacuum and on to the dental valve device.

The present disclosure provides a tailpiece for a dental valve that is small, lightweight, easy to handle, and easy to install.

The present disclosure also provides a tailpiece for a dental valve which is of simple construction and design and which can be easily employed with highly reliable results.

The present disclosure is related to a tailpiece for a dental valve that can be connected to a disposable dental valve device.

The present disclosure provides a tailpiece having a proximal end that does not use barbs, threads, or other structure having sharp edges which can damage a hose being connected to or removed from the tailpiece.

The present disclosure is related to a tailpiece for a dental valve device that may be used during a dental operation to assist in removing debris and liquid from an operating site.

The present disclosure also provides a tailpiece for a dental valve having a valve receiving end having an interior stop surface and a circumferential groove for receiving an O-ring for securing the dental valve within the valve receiving end of the tailpiece.

These and other advantages of the present disclosure will become apparent after considering the following detailed specification in conjunction with the accompanying drawings, wherein:

BRIEF DESCRIPTION OF THE DRAWINGS

FIG. 2 is a front perspective view of the tailpiece for a dental valve device constructed according to the present disclosure;

FIG. 4 is perspective view of the tailpiece for a dental valve device constructed according to the present disclosure; and FIG. 5 is a partial side view of the tailpiece for a dental valve device connected to a hose and a dental valve device.

DETAILED DESCRIPTION OF PREFERRED EMBODIMENTS

Figure 1:
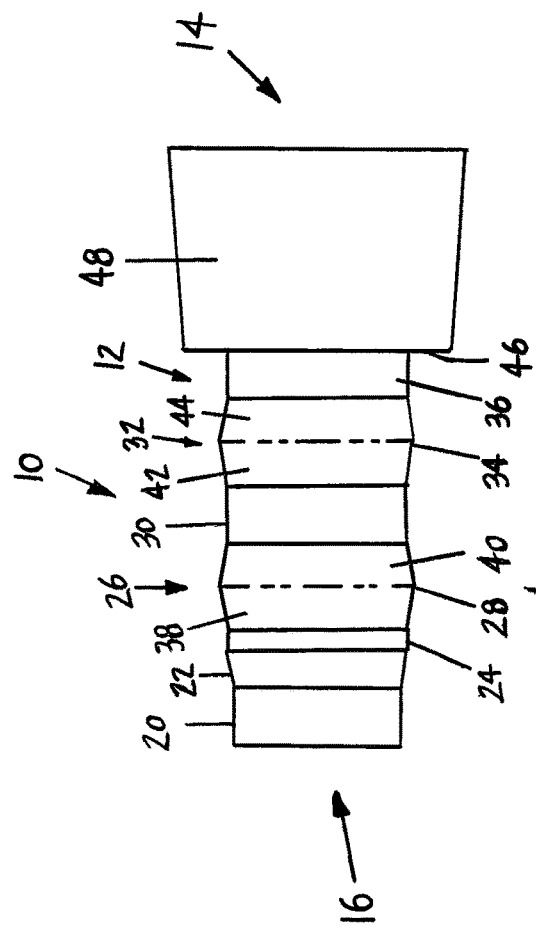
FIG. 1 is a side perspective view of a tailpiece for a dental valve device constructed according to the present disclosure.

Referring now to the drawings, wherein like numbers refer to like items, number 10 identifies a tailpiece for a dental valve device for use with a dental system constructed according to the present disclosure. With reference now to FIG. 1, the tailpiece 10 comprises a body 12 having a valve receiving or distal end 14, a hose receiving or proximal end 16, and a hose retaining section 18. The valve receiving end 14 is adapted to receive a dental valve (not shown) with the valve adapted to receive an evacuator tip device (not shown) such as a high volume evacuator that is used during a dental operation or procedure. The hose receiving end 16 is adapted to receive a vacuum line or a hose (not shown) which is connected to a suction system (also not shown).

The hose retaining section 18 has a hose insertion section 20, an inclined section 22, a first flat section 24, a first tapered ring section 26 having a central fillet section 28, a second flat section 30, a second tapered ring section 32 having a central fillet section 34, and a third flat section 36. The first tapered ring section 26 has a first section 38 that increases in diameter toward the fillet 28 and a second section 40 that decreases in diameter away from the fillet 28. The second tapered ring section 32 also has a first section 42 that increases in diameter from the second flat section 30 toward the fillet 34 and a second section 44 that decreases in diameter from the fillet 34 toward the third flat section 36. It is also possible and contemplated that the first sections 38 and 42 may each have a taper that is different than each taper of the second sections 40 and 44. In this manner, the lengths of each of the sections 38, 40, 42, and 44 may be different. It is also possible that the diameters of the central fillets 28 and 34 may be the same or different. The tapered ring sections 26 and 32 allow for a hose (not shown) to be quickly and efficiently inserted on to or removed from the tailpiece 10 without any chance of damaging the hose. For example, there may be times during a dental procedure when a large amount of debris becomes trapped in the tailpiece. When this occurs, the hose may need to be quickly removed from the tailpiece 10 and the debris emptied from the tailpiece. The tapered ring sections 26 and 32 allow for the hose to be easily removed and then reinserted on to the tailpiece 10. The valve receiving end 14 has a stop surface 46 that is adapted for a hose (not shown) to abut up against during use of the tailpiece 10. The valve receiving end 14 also has an exterior surface 48 that increases in diameter or flares outwardly from the stop surface 46.

FIG. 2 illustrates a perspective view of the hose receiving end 16 of the tailpiece 10. The tailpiece 10 is shown having a lumen or channel 50 between the hose receiving end 16 and the valve receiving end 14. This allows for the flow of any liquid or debris from a dental valve through the tailpiece 10 and out the hose receiving end 16 into a hose. The tailpiece 10 also has a cross member or dowel pin 52 that is press fit into the tailpiece 10. The dowel pin 52 acts as a filter to prevent any large items that are suctioned into the tailpiece 10 from passing into a hose (not shown) and becoming lodged therein. The hose receiving end 16 has a front annular surface or ring 54. Some of the components of the hose retaining section 18 are visible in this particular view. The first tapered ring section 26, the stop surface 46, and the exterior surface 48 are depicted.

Figure 3:
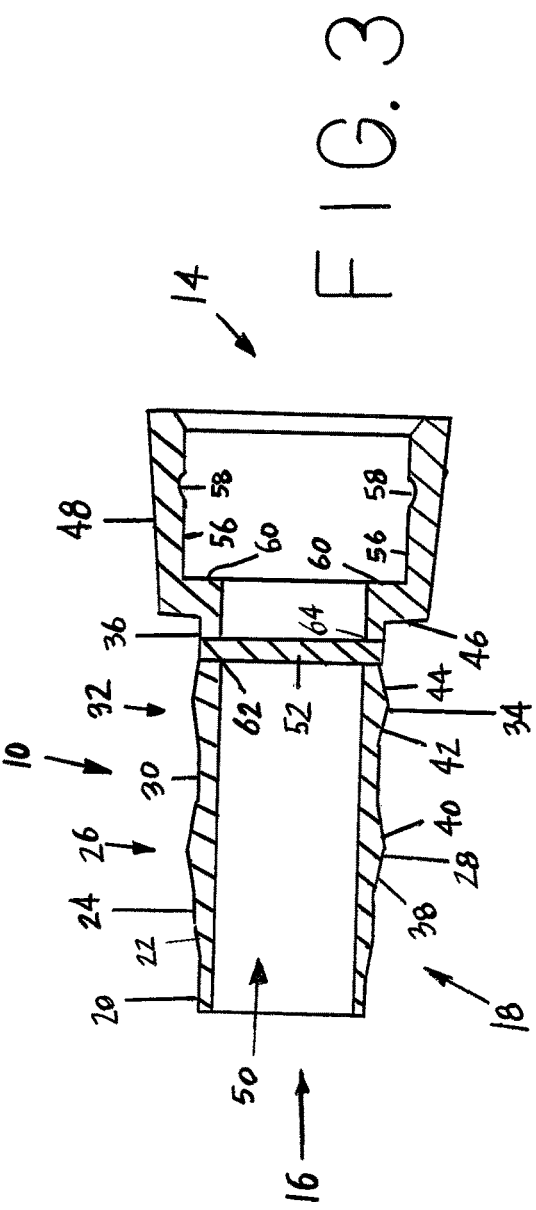
FIG. 3 a cross-sectional view of the tailpiece for a dental valve device taken along the plane of line 3-3 in FIG. 2.

With reference now to FIG. 3, a cross-sectional view of the tailpiece 10 is shown. The tailpiece 10 has the valve receiving end 14, the hose receiving end 16, and the lumen or channel 50 formed there between. The lumen 50 is generally circular in cross-section. However, various other cross-sectional configurations are possible such as oval, hexagonal, or squared. The hose retaining section 18 has the hose insertion section 20, the inclined section 22, the first flat section 24, the first tapered ring section 26 having the central fillet section 28, the second flat section 30, the second tapered ring section 32 having the central fillet section 34, and the third flat section 36. The first tapered ring section 26 has the first section 38 that increases in diameter toward the fillet section 28 and the second section 40 that decreases in diameter away from the fillet section 28. The second tapered ring section 32 is shown having the first section 42 that increases in diameter from the second flat section 30 toward the fillet section 34 and the second section 44 that decreases in diameter from the fillet section 34 toward the third flat section 36. The valve receiving end 14 has the annular stop surface 46 that allows a hose (not shown) to be placed against during use of the tailpiece 10. The valve receiving end 14 also has the exterior surface 48 that increases in diameter or flares outwardly from the stop surface 46.

The valve receiving end 14 has an annular interior surface 56 that is sized and shaped to receive a dental valve (not shown). The interior surface 56 has a circumferential groove or channel 58 that is adapted to accept an O-ring (not shown). The O-ring is used to further secure and seal a dental valve within the tailpiece 10. The O-ring also allows for the quick disconnect of the dental valve from within the tailpiece 10. It is also possible that the interior surface 56 may incorporate a structure to secure a dental valve within the valve receiving end 14 without the use of the channel 58 or the requirement of an O-ring. The valve receiving end 14 also has a back stop edge 60 that is used to position a dental valve within the end 14. The back stop edge 60 allows a dental valve to be positioned fully within the end 14. The dowel pin 52 is shown being inserted into a pair of openings 62 and 64 in the third flat section 36 of the hose retaining section 18. The dowel pin 52 is press fit into this position. The lumen or channel 50 is continuous between the valve receiving end 14 and the hose receiving end 16. Again, this allow for any debris or liquid to pass through the tailpiece 10.

FIG. 4 depicts a perspective view of the tailpiece 10. The hose receiving end 16 has the front ring 54 and the lumen 50. The hose retaining section 18 has the hose insertion section 20, the inclined section 22, the first flat section 24, the first tapered ring section 26 having the central fillet section 28, the second flat section 30, the second tapered ring section 32 having the central fillet section 34, and the third flat section 36. The first tapered ring section 26 has the first section 38 and the second section 40. The second tapered ring section 32 is shown having the first section 42 and the second section 44. The third flat section 36 has the dowel pin 52 inserted into the opening 62. The other opening 64 is not visible in this particular view. The valve receiving end 14 has the annular stop surface 46 and the exterior surface 48.

With particular reference now to FIG. 5, the tailpiece 10 is shown having a hose 70 inserted over the hose retaining section 18 (not shown) and abutting up against the stop surface 46 of the tailpiece 10. The particular construction of the hose retaining section 18 will not cause the hose 70 to rip or tear when being inserted over or removed from the section 18. A dental valve 72 is illustrated being inserted into the valve receiving end 14 for securing the dental valve 72 in place. Although not shown, the hose 70 is connected to a source of vacuum to remove any debris or liquid from a dental operation site, such as a mouth of a patient. Further, as is know, the dental valve 72 may have a rotatable valve body that can be manually operated to shutoff the source of suction when not needed.

In operation of the tailpiece 10, the hose receiving end 16 has the hose 70 inserted thereon and the hose 70 is connected to a suction system, The dental valve 72 is then inserted into the valve receiving end 14 to be secured in place. An evacuator tip is inserted into the dental valve 72 and then placed in a mouth of a dental patient during a procedure to remove debris or fluids from the mouth. Once the dental valve 72 is opened, air is allowed to flow through the evacuator tip, the dental valve 72, the lumen 50 of the tailpiece 50, the hose 70 and into a suction system. As has been previously indicated, if large debris or other items such as a cotton roll is accidentally suctioned into the tailpiece 10, the dowel pin 52 will block or trap such matter from entering into the hose 70 and becoming lodged within the hose 70. As can be appreciated, if such matter would become lodged within the hose 70 the entire system would have to be shut down to remove the matter from within the hose 70 or replace the hose 70. When suction is not needed during a dental procedure, the dental valve 72 is closed. Further, once a dental procedure has been completed, the dental valve 72 is closed.

The tailpiece 10 may be formed of any suitable material such as metal, plastic, polyethylene, and high density polyethylene or any other suitable material. Any suitable material may be used to construct the tailpiece 10 so that the tailpiece 10 may withstand use in a dental operation or procedure. It is also possible and contemplated to incorporate an antimicrobial agent or chemical in the plastic or to provide a coating of an antimicrobial agent on the plastic to further prevent cross-contamination when using the tailpiece 10 during a dental operation or procedure.

From all that has been said, it will be clear that there has thus been shown and described herein a tailpiece for a dental valve device which fulfills the various advantages sought therefore. It will become apparent to those skilled in the art, however, that many changes, modifications, variations, and other uses and applications of the subject tailpiece for a dental valve device are possible and contemplated. All changes, modifications, variations, and other uses and applications which do not depart from the spirit and scope of the disclosure are deemed to be covered by the disclosure, which is limited only by the claims which follow.

What is claimed is:

1. A tailpiece for a dental valve device comprising:
a body having a valve receiving end having an exterior stop surface, a hose receiving end, and a hose retaining section between the hose receiving end and the valve receiving end with the hose retaining section having a straight cylindrical hose insertion section adjacent the hose receiving end, an inclined section adjacent the straight cylindrical hose insertion section, a first straight cylindrical section having a diameter, the inclined section between the straight cylindrical hose insertion section and the first straight cylindrical section, the inclined section increasing in diameter between the straight cylindrical hose insertion section and the first straight cylindrical section with the inclined section increasing in diameter to the diameter of the first straight cylindrical section, a first tapered ring section adjacent the first straight cylindrical section having a first central fillet section, a second straight cylindrical section adjacent the first tapered ring section, the first tapered ring section having a first section that increases in taper between the first straight cylindrical section and the first central fillet section and a second section that decreases in taper between the first central fillet section and the second straight cylindrical section, a second tapered ring section adjacent the second straight cylindrical section having a second central fillet section, and a third straight cylindrical section adjacent the second tapered ring section, and the exterior stop surface for allowing a hose to abut up against the exterior stop surface and for preventing the hose from being retained by the valve receiving end, the valve receiving end having an exterior surface that flares outwardly over the entire exterior surface from the exterior stop surface to the valve receiving end.

2. The tailpiece for a dental valve device of claim 1 wherein the second tapered ring section has a first section that increases in taper between the second straight cylindrical section and the second central fillet section and a second section that decreases in taper between the second central fillet section and the third straight cylindrical section.

3. The tailpiece for a dental valve device of claim 1 wherein the valve receiving end further comprises an annular interior surface having a back stop edge to allow a dental valve to be positioned within the valve receiving end.

4. A tailpiece for a dental valve device comprising:
a body having a valve receiving end having an exterior stop surface, a hose receiving end, a lumen formed between the valve receiving end and the hose receiving end; and
a hose retaining section formed between the exterior stop surface and the hose receiving end having a straight cylindrical hose insertion section adjacent to the hose receiving end, an inclined section adjacent the straight cylindrical hose insertion section, a first straight cylindrical section having a diameter, the inclined section between the straight cylindrical hose insertion section and the first straight cylindrical section, the inclined section increasing in diameter between the straight cylindrical hose insertion section and the first straight cylindrical section with the inclined section increasing in diameter to the diameter of the first straight cylindrical section, a first tapered ring section having a first central fillet section, a second straight cylindrical section, the first tapered ring section having a first section that increases in taper between the first straight cylindrical section and the first central fillet section and a second section that decreases in taper between the first central fillet section and the second straight cylindrical section, a second tapered ring section having a second central fillet section, and a third straight cylindrical section, and the exterior stop surface for allowing a hose to abut up against the exterior stop surface and for preventing the hose from being retained by the valve receiving end, the valve receiving end having an exterior surface that flares outwardly over the entire exterior surface from the exterior stop surface to the valve receiving end.

5. The tailpiece for a dental valve device of claim 4 wherein the second tapered ring section has a first section that increases in taper between the second straight cylindrical section and the second central fillet section and a second section that decreases in taper between the second central fillet section and the third straight cylindrical section.

6. A tailpiece for a dental valve device comprising:
a body having a valve receiving end having an exterior stop surface and an interior stop surface, a hose receiving end, and a lumen formed between the valve receiving end and the hose receiving end; and
a hose retaining section formed between the exterior stop surface and the hose receiving end, the hose receiving end having a straight cylindrical hose insertion section adjacent the hose receiving end, an inclined section adjacent to the straight cylindrical hose insertion section, a first straight cylindrical section having a diameter, the inclined section between the straight cylindrical hose insertion section and the first straight cylindrical section, the inclined section increasing in diameter between the straight cylindrical hose insertion section and the first straight cylindrical section with the inclined section increasing in diameter to the diameter of the first straight cylindrical section, a first tapered ring section having a first central fillet section, a second straight cylindrical section, the first tapered ring section having a first section that increases in taper between the first straight cylindrical section and the first central fillet section and a second section that decreases in taper between the first central fillet section and the second straight cylindrical section, a second tapered ring section having a second central fillet section, and a third straight cylindrical section, and the exterior stop surface for allowing a hose to abut up against the exterior stop surface and for preventing the hose from being retained by the valve receiving end, the valve receiving end having an exterior surface that flares outwardly over the entire exterior surface from the exterior stop surface to the valve receiving end and an interior surface that flares outwardly from the interior stop surface to the valve receiving end.

7. The tailpiece for a dental valve device of claim 6 wherein the second tapered ring section has a first section that increases in taper between the second straight cylindrical section and the second central fillet section and a second section that decreases in taper between the second central fillet section and the third straight cylindrical section.

* * * * *